United States Patent
Lickfelt

(10) Patent No.: US 8,896,418 B2
(45) Date of Patent: Nov. 25, 2014

(54) METHOD TO INCREASE ACCURACY OF LOCATING UNIT IN WIRELESS VEHICLE SYSTEM

(75) Inventor: Brian K. Lickfelt, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 233 days.

(21) Appl. No.: 13/234,548

(22) Filed: Sep. 16, 2011

(65) Prior Publication Data
US 2013/0069760 A1     Mar. 21, 2013

(51) Int. Cl.
*G06F 7/04*     (2006.01)

(52) U.S. Cl.
USPC ............... 340/5.61; 455/67.11; 340/5.72

(58) Field of Classification Search
CPC ........... H04B 17/0057; G07C 9/00309; G07C 2209/63; B60C 23/0416; B60C 23/045; B60C 23/0444
USPC ............. 340/5.61, 5.62, 5.63, 5.64, 5.7, 5.72, 340/5.32, 5.33, 5.65, 539.11, 10.1, 10.34, 340/10.4, 10.41, 10.5
See application file for complete search history.

(56) References Cited

U.S. PATENT DOCUMENTS

| | | |
|---|---|---|
| 5,463,374 A | 10/1995 | Mendez et al. |
| 6,396,412 B1 | 5/2002 | Banas |
| 6,489,888 B1 | 12/2002 | Honeck et al. |
| 6,597,284 B2 | 7/2003 | Juzswik |
| 6,857,310 B2 | 2/2005 | Bergerhoff et al. |
| 7,019,628 B2 | 3/2006 | Ichinose |
| 7,026,953 B2 | 4/2006 | Fujii |
| 7,042,342 B2 | 5/2006 | Luo et al. |
| 7,068,157 B2 | 6/2006 | Ikeda et al. |
| 7,102,498 B2 | 9/2006 | Desai et al. |
| 7,145,445 B2 | 12/2006 | Tranchina |
| 7,369,040 B2 | 5/2008 | Baumgartner et al. |
| 7,385,485 B2 | 6/2008 | Thomas et al. |
| 7,436,289 B2 | 10/2008 | Desai et al. |
| 7,456,732 B2 | 11/2008 | Tranchina |
| 7,474,195 B2 | 1/2009 | Farrell |
| 7,629,875 B2 | 12/2009 | Baumgartner et al. |
| 7,768,392 B1 | 8/2010 | Brand et al. |
| 7,872,568 B2 | 1/2011 | Fink et al. |
| 2005/0275511 A1 | 12/2005 | Luo et al. |
| 2007/0090970 A1* | 4/2007 | Watabe .................... 340/901 |
| 2007/0162191 A1 | 7/2007 | Matsubara et al. |
| 2008/0150712 A1 | 6/2008 | Cooprider et al. |
| 2009/0102634 A1 | 4/2009 | Okada et al. |
| 2009/0153317 A1 | 6/2009 | Kim |
| 2009/0289783 A1 | 11/2009 | Kim |
| 2010/0191392 A1 | 7/2010 | Juzswik |
| 2010/0305779 A1 | 12/2010 | Hassan et al. |

\* cited by examiner

OTHER PUBLICATIONS

International Search Report and Written Opinion of PCT/US12/54430 dated Nov. 26, 2012.

*Primary Examiner* — Nabil Syed
(74) *Attorney, Agent, or Firm* — Rankin, Hill & Clark LLP

(57) ABSTRACT

A wireless unit for a wireless vehicle system includes a receiver for receiving a vehicle-originating signal, a transmitter for transmitting a reply signal, a received signal strength indicator (RSSI) for determining a received signal strength of the vehicle-originating signal, a memory for storing sensitivity data, and a control unit in electrical communication with the receiver, the transmitter, the RSSI and the memory. The receiver has a sensitivity, and the memory is for storing sensitivity data corresponding to the sensitivity of the receiver. The control unit is configured to communicate with the transmitter to direct the transmitter to transmit the reply signal. The reply signal includes received signal strength data used for determining a distance between the wireless unit and an associated vehicle-side transmitter on an associated vehicle. The received signal strength data is based on the received signal strength and the sensitivity data.

3 Claims, 3 Drawing Sheets

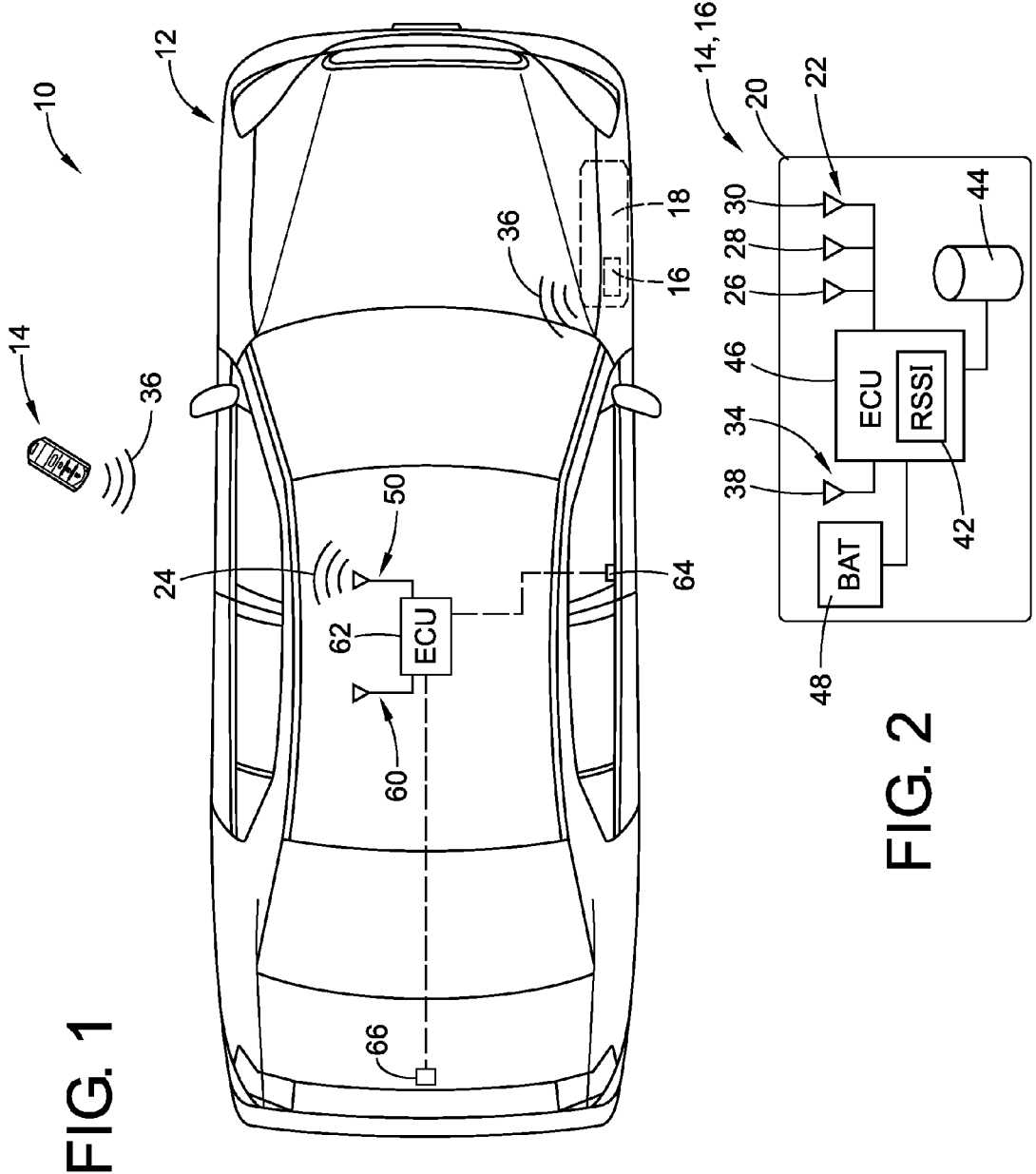

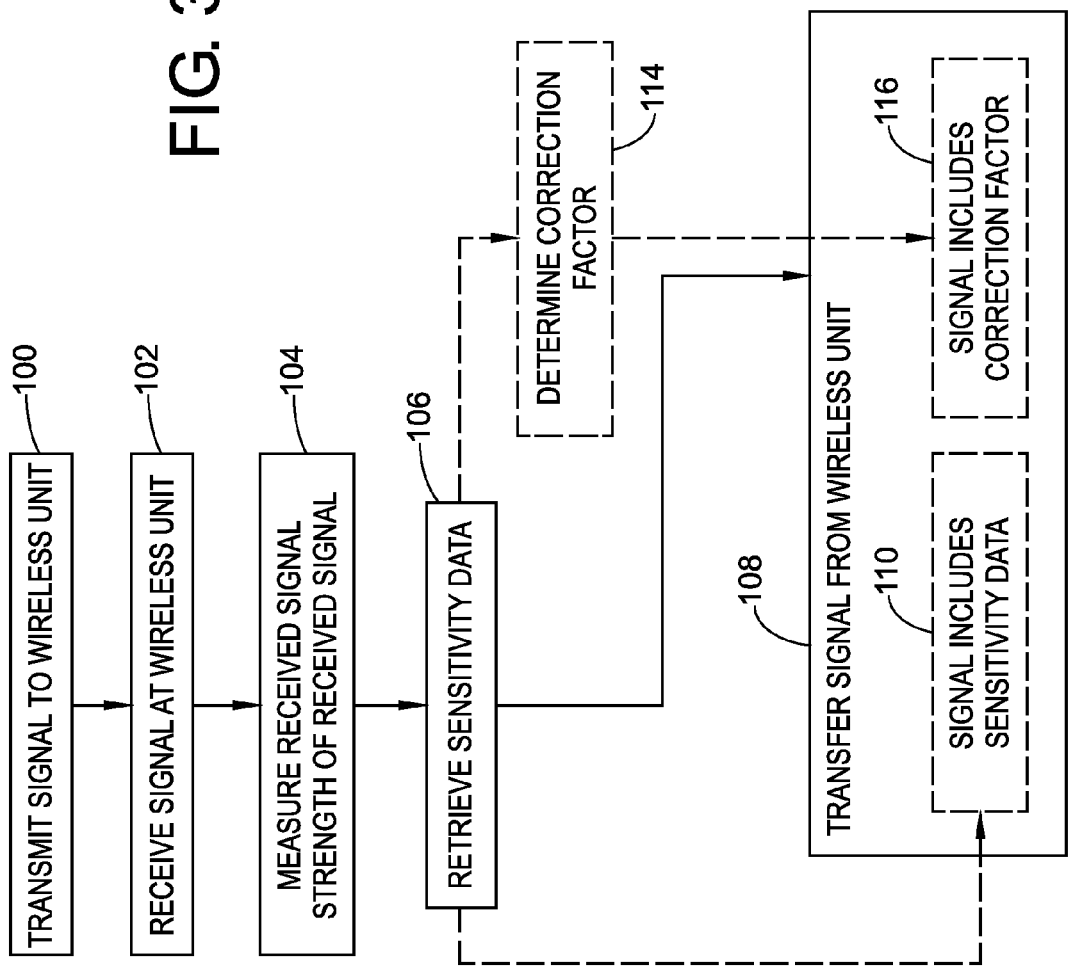

METHOD TO INCREASE ACCURACY OF LOCATING UNIT IN WIRELESS VEHICLE SYSTEM

BACKGROUND

Key fobs used with vehicle passive entry systems are able to measure the received signal strength from a vehicle-originating signal, in order to feedback the signal strength information to the vehicle, so that the location of the key fob with respect to the vehicle can be calculated. The location calculation accuracy depends upon the accuracy of the entire system from a low frequency ("LF") transmission from the vehicle to the measurement of that power received at the key fob. The vehicle-side transmission can be rather accurately determined, because a closed-looped measurement of antenna power can be made based on current and voltage measurements within a drive circuit associated with the vehicle-side transmitting antenna.

The sensitivity of a receiving circuit (including antennas and other circuits) on the fob can be determined by a measurement made in a controlled environment at the fob manufacturing plant. The antenna on the fob measures the vehicle-originating LF transmission in three mutually perpendicular axes (x-axis, y-axis and z-axis). Three sensitivity measurements are taken, one for each axis. If the sensitivity measurements result in a value that is outside a predefined tolerance, then the fob is discarded. Because of this predefined tolerance, the vehicle-side receiving antenna knows the sensitivity "window," which is based on the predefined tolerance, every fob falls into, so that a reasonable calculation can be made for the position of the fob with respect to the vehicle-side transmitter.

This system allows for fobs to be easily added to the system as a service part, with no concern for learning the new fob's sensitivity. There are problems, however, with this current system. The accuracy of the location of the fob is limited because the "window" for allowable tolerance must remain somewhat wide, for mass production variation of the design and its components. Narrowing the tolerance of the "window" would result in an increase in the location accuracy, but would also increase the number of fobs that must be discarded for falling outside the predefined tolerance. One manner to overcome this problem of too many fobs falling outside the predefined tolerance would be to sort the fobs into different categories having different tolerance "windows." From a manufacturing standpoint, sorting is never preferred because scrap is generated and this cost is transferred to the vehicle manufacturer and then to the end customer.

SUMMARY

An example of a wireless unit for a wireless vehicle system that can overcome at least one of the aforementioned shortcomings includes a receiver for receiving a vehicle-originating signal, a transmitter for transmitting a reply signal, a received signal strength indicator (RSSI) for determining a received signal strength of the vehicle-originating signal, a memory for storing sensitivity data, and a control unit in electrical communication with the receiver, the transmitter, the RSSI and the memory. The receiver has a sensitivity, and the memory is for storing sensitivity data corresponding to the sensitivity. The control unit is configured to communicate with the transmitter to direct the transmitter to transmit the reply signal. The reply signal includes received signal strength data used for determining a distance between the wireless unit and an associated vehicle-side transmitter on an associated vehicle. The received signal strength data is based on the received signal strength of the vehicle-originating signal and the sensitivity data of the receiver.

An example of a vehicle passive entry system that can overcome at least one of the aforementioned shortcomings includes the aforementioned wireless unit, which can be a fob, a vehicle-side transmitter, a vehicle-side receiver, and a vehicle-side control unit. The vehicle-side transmitter is for transmitting the vehicle-originating signal. The vehicle-side receiver is for receiving the reply signal. The vehicle-side control unit is in electrical communication with the vehicle-side transmitter and the vehicle-side receiver.

A method for manufacturing a wireless unit for a wireless vehicle system that can overcome at least one of the aforementioned shortcomings includes transmitting a signal from a transmitter to a wireless unit and determining an expected received signal strength to be measured by the wireless unit based on the signal from the transmitter. The method further includes receiving the signal via an antenna on the wireless unit and measuring the received signal strength of the received signal. The method further includes comparing the expected received signal strength to the measured received signal strength and determining a sensitivity of the wireless unit based on comparing the expected received signal strength to the measured received signal strength.

A method for operating a wireless vehicle system that can overcome at least one of the aforementioned shortcomings includes transmitting a vehicle-originating signal from a vehicle-transmitter and receiving the vehicle-originating signal via a receiver on the wireless unit. The method further includes measuring a received signal strength of the vehicle-originating signal and retrieving sensitivity data from a memory on the wireless unit. The method further includes transmitting a reply signal from the wireless unit. The reply signal includes received signal strength data used for determining a distance between the wireless unit and the vehicle-side transmitter and the received signal strength data is based on the received signal strength and the sensitivity data.

BRIEF DESCRIPTION OF THE DRAWINGS

FIG. 1 is a schematic depiction of an example of a wireless vehicle system, such as a combined vehicle passive entry and tire pressure monitoring system.

FIG. 2 is a schematic depiction of a wireless unit, such as a fob or a tire monitoring unit for the wireless vehicle system depicted in FIG. 1.

FIG. 3 is a flow chart depicting a method for operating a wireless vehicle system, such as the wireless vehicle system depicted in FIG. 1.

DETAILED DESCRIPTION

Figure 4:
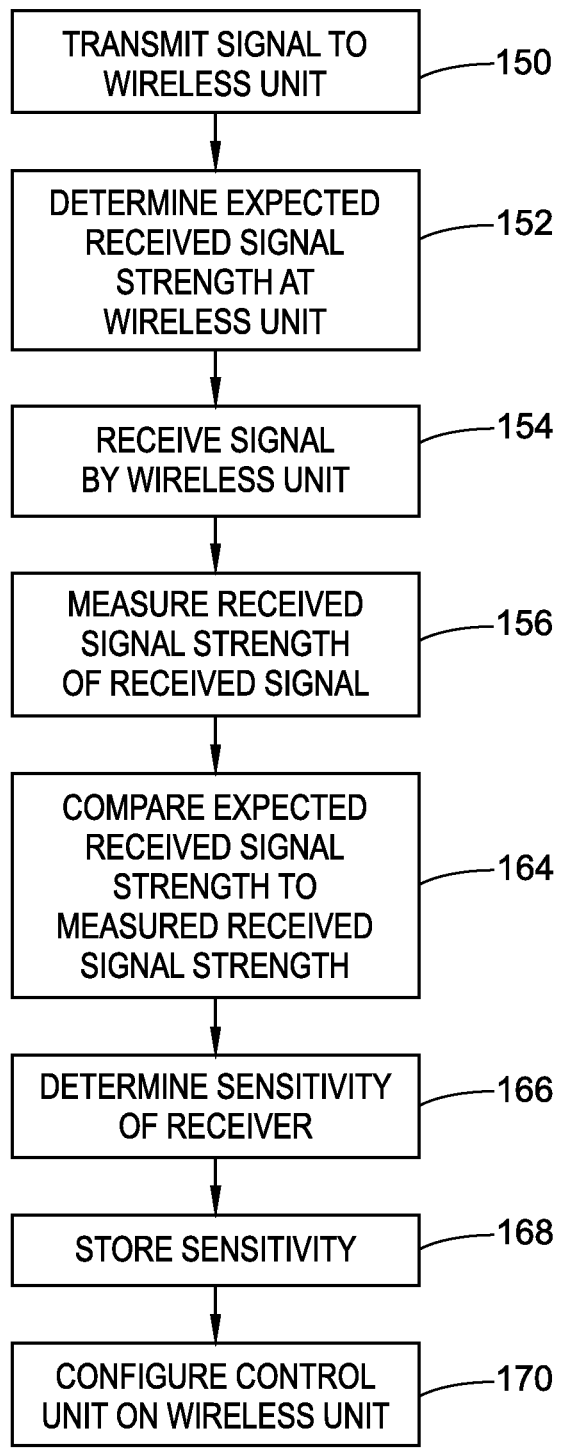
FIG. 4 is a flow chart depicting a method for manufacturing a wireless unit, such as the wireless unit shown in FIG. 2.

Throughout the specification and claims, the following terms take the meanings explicitly associated herein, unless the context clearly dictates otherwise. As used herein, the term "or" is equivalent to the term "and/or" unless the context clearly dictates otherwise. The term "based on" is not exclusive and allows for being based on additional factors not described, unless the context clearly dictates otherwise. In addition, throughout the specification and claims, the meaning of "a," "an," and "the" includes plural references. Moreover, reciting a number of components, e.g., "three antennas", does not preclude the use of more than three components, and unless the context clearly dictates otherwise, the recitation of a certain number of components should be construed as a minimum number of components. The descriptions and drawings herein are merely illustrative and various modifications and changes can be made in the structures and steps disclosed without departing from the present disclosure. Various identified components of a vehicle disclosed herein are merely terms of art and may vary from one vehicle manufacturer to another. The terms should not be deemed to limit the present disclosure. The drawings are shown for purposes of illustrating one or more exemplary embodiments and are not for purposes of limiting the appended claims. All references to direction and position, unless otherwise indicated, refer to the orientation of the vehicle components illustrated in the drawings and should not be construed as limiting the appended claims.

FIG. 1 schematically depicts an example of a wireless vehicle system, e.g., a vehicle passive entry system 10 that includes a vehicle 12 and a key fob 14. The vehicle passive entry system 10 is configured to more accurately locate the fob 14 with respect to the vehicle 12 as compared to known passive entry systems. Another wireless vehicle system is a tire pressure monitoring system (TPMS). The TPMS includes a tire monitoring unit 16 (only one shown in FIG. 1) mounted to each tire 18 of the vehicle 12. It is also desirable to determine the location of the tire monitoring unit 16, for example to locate the tire monitoring unit as being mounted to the left front tire of the vehicle.

The wireless vehicle system, such as that shown in FIG. 1, can be a system that combines passive entry and wireless tire monitoring. Many of the components of the fob 14 can also be found on the tire monitoring unit 16. Like components for the fob 14 and the tire monitoring unit 16 will be referred to with like reference numbers. Where components that are common to both the fob and the tire monitoring unit are described, the components may be described with reference to a wireless unit 14, 16, which is meant to encompass either the fob 14 or the tire monitoring unit 16.

With reference to FIG. 2, the wireless unit 14, 16 includes a housing 20, which for the fob 14 can be made from plastic similar to known fobs and for the tire monitoring unit 16 can be similar to known tire monitoring units. The wireless unit 14, 16 also includes a receiver 22 for receiving vehicle-originating signals 24 (FIG. 1). In the depicted embodiment, the receiver 22 is a three-dimensional antenna capable of detecting low frequency (LF) vehicle-originating signals 24 (FIG. 1) in three mutually perpendicular axes. As such, the receiver 22 can include an x-axis antenna 26, a y-axis antenna 28, and a z-axis antenna 30.

The wireless unit 14, 16 further includes a transmitter 34 for transmitting a reply signal 36 (FIG. 1) from the fob 14 to the vehicle 12. In the illustrated embodiment, the transmitter 34 includes a radio frequency (RF) antenna 38 capable of transmitting RF signals 36 (FIG. 1) from the fob 14 to the vehicle 12.

The wireless unit 14, 16 further includes a received signal strength indicator (RSSI) 42 for determining a received signal strength of the vehicle-originating signals 24 (FIG. 1). The RSSI 42 can include circuitry capable of measuring the received signal strength of the vehicle-originating signals 24 emanating from the vehicle 12 similar to known RSSI devices.

The wireless unit 14, 16 further includes a memory 44 for storing sensitivity data corresponding to the sensitivity of the receiving antennas 26, 28 and 30 and other circuitry (the antennas and other circuitry can make up a receiving circuit) on the wireless unit 14, 16 that processes the received signals.

The sensitivity of each of the receiving antennas 26, 28, 30 is determined in a manner which will be described in more detail below.

The wireless unit 14, 16 further includes a control unit 46, which is depicted as an electronic control unit (ECU), in electrical communication with the receiver 22, the transmitter 34, the RSSI 42, and the memory 44. The ECU 46 is configured to communicate with the transmitter 34 to direct the transmitter to transmit the reply signal 36 (FIG. 1). For the illustrated wireless vehicle system 10 (FIG. 1), the reply signal 36 (FIG. 1) includes received signal strength data used for determining a distance between the wireless unit 14, 16 and a vehicle-side transmitter 50 (FIG. 1) on the vehicle 12. The received signal strength data, which will be described in more detail below, is based on the received signal strength of the vehicle-originating signal 24 and the sensitivity data, which is stored in the memory 44 of the wireless unit 14, 16.

The wireless unit 14, 16 further includes a power source, which is depicted as a battery 48. An alternative power source, such as solar power sources, as well as other energy harvesting generators could be utilized. The fob 14 is depicted as similar to known key fobs, with the exception of the memory 44 and the data stored therein. Other devices could be used to communicate with the vehicle 12, such as a personal digital assistant (PDA), a mobile phone, a tablet computing device, and other handheld devices capable of receiving and transmitting signals. All of these other aforementioned devices for the purposes of this disclosure can be referred to as fobs and/or key fobs. The tire monitoring unit 16 is also similar to known tire monitoring units, with the exception of the memory 44 and the data stored therein. Accordingly, the tire monitoring unit 16 can include sensors (not shown) for measuring the air pressure of the tire and other data that is measured by known tire monitoring units.

The wireless vehicle system 10 further includes the vehicle-side transmitter 50 for transmitting the vehicle-originating signals 24. In the depicted embodiment, the vehicle-side transmitter 50 is an LF transmitting antenna. The wireless vehicle system 10 further includes a vehicle-side receiver 60 for receiving the reply signals 36 from the wireless unit 14, 16. In the illustrated embodiment, the vehicle-side receiver 60 is an RF antenna capable of picking up the reply signal 36 from the wireless unit 14, 16.

The wireless vehicle system 12 further includes a vehicle-side control unit 62 in electrical communication with the vehicle-side transmitter 50 and the vehicle-side receiver 60. As depicted, the vehicle-side control unit 62 is an electronic control unit (ECU). The vehicle-side ECU 62 is also in electrical communication with door locks 64 (only one is shown in FIG. 1), a trunk lock 66, as well as other components on the vehicle, such as a display (not shown) to display tire status data, the ignition (not shown) and other electrical components. The wireless unit 14, 16 transmits reply signals 36 to the vehicle-side ECU 62 that are received by the vehicle-side receiver 60. Based on information found in the reply signals 36, the ECU 62 operates certain components on the vehicle. For example, the reply signal 36 from the fob 14 can change the state of the door locks 64 as well as operating other components commonly operated by fobs found in conventional vehicle passive entry systems. The reply signal 36 from the tire monitoring unit 16 can provide tire pressure data for the tire 18.

Operation of the wireless vehicle system 10 will be described with reference to FIG. 3, which depicts a method for operating the wireless vehicle system. Even though the flow diagram depicted in FIG. 3 depicts steps in a particular order and will also be described with reference to the embodiment of the wireless vehicle system 10 depicted in FIG. 1, the exact order of the steps depicted in FIG. 3 is not particularly important and the method depicted in FIG. 3 can be operated with other wireless vehicle systems capable of operating the steps shown in FIG. 3. At 100, the vehicle-originating signal 24 is transmitted to the wireless unit 14, 16. At 102, the vehicle-originating signal is received via the receiver 22 (FIG. 2) on the wireless unit 14, 16. LF electromagnetic signals radiated from a transmitter coil antenna, such as the transmitter antenna 50 depicted in FIG. 1, propagate with a certain direction angle at which the magnetic field is strongest, and decays as moved away from its center. As such, the wireless unit 14, 16 includes a three-dimensional antenna for detecting the vehicle-originating signals 50 in three mutually perpendicular axes. At 104, the received signal strength for each antenna 26, 28, 30 can be measured in the RSSI 42.

At 106, sensitivity data for the receiver 22 is retrieved from the memory 44 (FIG. 2) on the wireless unit 14, 16. As will be explained in further detail below, the sensitivity data for each of the receiving antennas 26, 28, 30 on the wireless unit 14, 16 is based on a reference calibration, which can take place at the fob or the tire monitoring unit manufacturing facility, and includes all receiving circuitry on the wireless unit 14, 16 including the receiver 22 and the control unit 46.

At 108, the method for operating the wireless vehicle system includes transmitting the reply signal 36 (FIG. 1) from the wireless unit 14, 16 to the vehicle-side receiver 60. The reply signal 36 from the wireless unit 14, 16 includes received signal strength data used for determining a distance between the wireless unit 14, 16 and the vehicle-side transmitter 50. The received signal strength data is based on the received signal strength of the vehicle-originating signal and the sensitivity data of each of the receiving antennas 26, 28, 30 and associated receiving circuitry on the wireless unit 14, 16. Based on the configuration of the wireless vehicle system 10, the received signal strength data can take different forms. Before explaining the different forms of received signal strength data that can be found in the reply signal 36 from the wireless unit 14, 16, however, a method for manufacturing the wireless unit will be described, which will further explain how the sensitivity is determined for the receiver 22.

A method for manufacturing a wireless unit will be described with reference to FIG. 4. For ease of understanding, the method depicted in FIG. 4 is laid out in a logical order of steps; however, the order of the steps can be changed from that shown in FIG. 4 without departing from the scope of the appended claims. Additionally, the method described with reference to FIG. 4 will also be described with reference to the wireless unit 14, 16 depicted in FIG. 2; however, the method for manufacturing the wireless unit could be utilized in manufacturing other key fobs and/or tire monitoring units that include a greater or fewer number of components than that shown in FIG. 2.

At 150, an LF signal is transmitted from an LF transmitter to the wireless unit 14, 16. This LF signal is similar to the LF signal 24 transmitted from the transmitter 50 on the vehicle, however, this LF signal is transmitted in a factory controlled environment using an LF antenna, similar to the LF antenna found in the vehicle-side receiver 50 depicted in FIG. 1.

The method for manufacturing the wireless unit 14 further includes, at 152, determining an expected received signal strength to be measured by the receiving circuit of the wireless unit based on the signal from the transmitter. The power of the signal transmitted to the wireless unit 14, 16 is measured based on current and voltage measurements of a drive circuit for the aforementioned LF antenna. Transmission power of the LF signal can be easily determined, because a closed loop measurement of antenna power can be made for the transmitting antenna based on current and voltage measurements within the drive circuit for the transmitting antenna. Knowing the power of the signal transmitted by the transmitter, at 150, the expected received signal strength that is to be measured by the wireless unit can be calculated based on the distance between the transmitter and the wireless unit and the power of the transmitted signal. The expected received signal strength can also be determined by measuring the power of the signal using a calibrated receiver.

The method for manufacturing the wireless unit 14, 16 further includes, at 154, receiving the LF signal via an antenna, such as the receiving antennas 26, 28, 30 (FIG. 2), on the wireless unit 14, 16. As mentioned above, the wireless unit 14, 16 can include the x-axis antenna 26, the y-axis antenna 28, and the z-axis antenna 30. As mentioned above, LF electromagnetic signals radiated from a transmitter coil antenna propagate with a certain direction angle at which the magnetic field is strongest and decay is moved away from its center. To compensate for this, the wireless unit 14, 16 includes a three-dimensional antenna receiver capable of detecting signals in three mutually perpendicular axes.

The method for manufacturing the wireless unit 14, 16 further includes, at 156, measuring the received signal strength of the received LF signal. With reference back to FIG. 2, the receiver 22 on the wireless unit 14, 16 includes three antennas 26, 28, 30 for detecting LF signals in three mutually perpendicular axes. The received signal strength of the received LF signal can be measured in the RSSI 42 for each of these axes.

The method for manufacturing the wireless unit 14, 16 can further include, at 164, comparing the expected received signal strength, determined at 152, to the measured received signal strength, measured at 156. The method for manufacturing the wireless unit 14, 16 can further include, at 166, determining a sensitivity of the receiver 22 of the wireless unit 14, 16. The sensitivity of the receiver 22 can be expressed as a relationship between the expected received signal strength, calculated at 152, and the measured received signal strength, measured at 156. The relationship can be expressed as a difference between the expected received signal strength and the measured received signal strength, or a ratio, for example, presented as a percentage, of the expected received signal strength to the measured received signal strength, or another functional relationship between the expected received signal strength and the measured received signal strength. Moreover, the sensitivity can correspond to an x-axis sensitivity for the x-axis antenna 26, a y-axis sensitivity for the y-axis antenna 28, and a z-axis sensitivity for the z-axis antenna 30.

The method for manufacturing the wireless unit 14, 16 can further include, at 168, storing the sensitivity in the memory 44 on the wireless unit 14, 16. The sensitivity data can be associated with each axis, e.g., an x-axis sensitivity, a y-axis sensitivity and a z-axis sensitivity. By storing the sensitivity of the receiver 22, which can be stored as sensitivity data associated with each of the antennas 26, 28, 30, the location of the wireless unit 14, 16 with respect to the vehicle-side transmitter 50 can be determined with much greater accuracy. This makes the aforementioned sensitivity "window" of each fob irrelevant because the ECU 46 on the fob 14 can provide the stored sensitivity data to the vehicle-side ECU, and the vehicle-side ECU 62 can utilize this sensitivity data to more accurately determine the location of the fob 14 with respect to the vehicle-side transmitter 50. This also allows for the distance between the tire monitoring unit 16 and the vehicle-side transmitter 50 to be more accurately determined as compared to known tire monitoring units.

The method for manufacturing the wireless unit 14, 16 can further include, at 170, configuring the control unit 46 on the wireless unit 14, 16. For the fob 14 the reply signal 36 (FIG. 1) can control a component on the vehicle 12, such as the door locks 64 and the trunk lock 66, as well as other components (e.g., ignition, vehicle lights, vehicle settings). For the tire monitoring unit 16 the reply signal 36 can provide tire status data to the vehicle-side ECU 62 for display on a display (not shown) found in the vehicle 12. The reply signal 36 from the wireless unit 14, 16 can include measured signal strength data associated with the stored sensitivity, which was stored at 168.

The control unit 46 on the wireless unit 14, 16 can further be configured to determine a correction factor based on the stored sensitivity, which was stored at 170. For example, the ECU 46 on the wireless unit 14, 16 could automatically add or subtract the correction factor as an internal compensation, and then send this correction factor back to the vehicle. In this embodiment, the wireless unit 14, 16 is "self correcting" such that every time the vehicle-side ECU 62 receives the reply signal 36 (FIG. 1) the vehicle-side ECU can assume that every wireless unit 14, 16 has the same overall level of sensitivity based on the correction factor. As such, sensitivity is contained within the individual key fob 14 or the individual tire monitoring unit 16, and is not linked to the wireless vehicle system 10.

The correction factor can be a value that compensates for the sensitivity of the wireless unit 14, 16 as compared to a benchmark sensitivity. The benchmark sensitivity can be the sensitivity for a perfectly, or nearly perfectly calibrated fob or tire monitoring unit. The correction factor can compensate for wireless units that are not "perfectly" calibrated, i.e., for wireless units that measure a received signal strength that differs from the actual signal strength of the transmitted signal. This correction factor value could be transmitted with the reply signal 36 to correct for the inaccurate measurement of the received signal strength, which would then allow the vehicle-side ECU to assume that each fob or tire monitoring unit in the wireless vehicle system 10 has the benchmark sensitivity. The benchmark sensitivity has a much smaller tolerance "window" as compared to known fobs and known tire monitoring units, which allows for the vehicle-side ECU to more accurately determine the location of the fob 14 or the tire monitoring unit 16 with respect to the vehicle-side transmitter 50.

The ECU 46 on the wireless unit 14, 16 could also be configured to calculate a calibrated received signal strength based on the stored sensitivity, which was stored at 170. In this type of example, the reply signal 36 (FIG. 1) could include the calibrated received signal strength and send this data to the vehicle-side ECU 62 via the vehicle-side transmitter 50.

As mentioned above, the received signal strength data, which can be sent as part of the reply signal 36 from the wireless unit 14, 16 to the vehicle-side ECU 62, can take a number of different forms. With reference back to FIG. 3, after the sensitivity data has been retrieved from the memory 44 on the wireless unit 14, 16, at 106, the reply signal 36 (FIG. 1) is transmitted from the wireless unit 14, 16 to the vehicle-side receiver 60 at 110. In this instance, the reply signal can include the sensitivity data for each of the receiving antennas 26, 28, 30 on the wireless unit 14, 16. The vehicle-side ECU 62 can take this sensitivity data and the received signal strength data, which is also sent as part of the reply signal 26 and includes the measured received signal strength of the vehicle-originating signal 24 (FIG. 1), and calculate the distance that the wireless unit 14, 16 is spaced from the vehicle-side transmitter 50. As mentioned above, in known systems each of the antennas on a fob has a predefined tolerance. The same is true for known tire monitoring units. The accuracy of the location calculation performed in the vehicle-side ECU in known passive entry systems is limited because the "window" of the predefined tolerance for each of the antennas on a fob must remain somewhat wide for mass production variation of the design and its components. The same is true for known tire monitoring units. Providing the sensitivity data in the reply signal 24 from the wireless unit 14, 16 allows the vehicle-side ECU 62 to compensate for the individual (unique) sensitivity for each key fob or tire monitoring unit and calculate the position of the key fob 14 or tire monitoring unit 16 with respect to the vehicle-side transmitter 50 to a much higher degree of accuracy.

With reference back to FIG. 3, the method for operating the wireless vehicle system 10 could further include determining a correction factor, at 114, based on the sensitivity data retrieved from the memory 44 on the wireless unit 14, 16. When the reply signal is transmitted from the wireless unit 14, 16, at 116, the reply signal 36 from the wireless unit 14, 16 can include the correction factor along with the received signal strength data. The distance between the wireless unit 14, 16 and the vehicle-side transmitter 50 could then be determined based on the correction factor and the RSSI data.

A wireless vehicle system that allows for a more accurate determination of the location of the fob 14 or the tire monitoring unit 16 with respect to the vehicle-side transmitter 50 has been described above with particularity. Modifications and alterations will occur to those upon reading and understanding the preceding detailed description. The invention, however, is not only limited to the embodiments and methods described above. Instead, the invention is broadly defined by the appended claims and the equivalents thereof.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle passive entry system comprising:
 a key fob including
  a receiver for receiving a vehicle-originating signal, the receiver having a sensitivity, wherein the sensitivity is based on comparing an expected received signal strength from an LF antenna in a factory controlled environment and a measured received signal strength from the LF antenna in the factory controlled environment;
  a transmitter for transmitting a reply signal;
  a received signal strength indicator (RSSI) for measuring a received signal strength of the vehicle-originating signal;
  a memory storing sensitivity data corresponding to the sensitivity;
  a control unit in electrical communication with the receiver, the transmitter, the RSSI and the memory, wherein the control unit is configured to communicate with the transmitter to direct the transmitter to transmit the reply signal, wherein the reply signal includes the measured received signal strength data from the RSSI and the sensitivity data from the memory,
  wherein the receiver includes antennas for detecting the vehicle-originating signals in three mutually perpendicular axes, wherein the sensitivity corresponds to an x-axis sensitivity, a y-axis sensitivity and a z-axis sensitivity, and the sensitivity data includes x-axis sensitivity data, y-axis sensitivity data and z-axis sensitivity data; and a vehicle-side transmitter for transmitting the vehicle-originating signal;

a vehicle-side receiver for receiving the reply signal; and a vehicle-side control unit in electrical communication with the vehicle-side transmitter and the vehicle-side receiver, wherein the vehicle-side control unit is configured to compensate for the sensitivity unique to the key fob and to determine a distance between the vehicle-side receiver and the key fob based on the measured received signal strength and the sensitivity data in the reply signal.

2. A method for operating a wireless vehicle system comprising:

transmitting a vehicle-originating signal from a vehicle-side transmitter;

receiving the vehicle-originating signal via a receiver on a key fob;

measuring a received signal strength of the vehicle-originating signal;

retrieving sensitivity data from a memory on the key fob;

transmitting a reply signal from the key fob, wherein the reply signal includes the measured signal strength data and the sensitivity data;

receiving the reply signal in a vehicle—side receiver;

determining in a vehicle—side control unit a correction factor based on the sensitivity data, wherein the correction factor is a value that compensates for a respective sensitivity of the key fob as compared to a benchmark sensitivity; and calculating in the vehicle—side control unit a distance that the key fob is spaced from the vehicle—side transmitter based on the determined correction factor and the measured signal strength data that was received in the reply signal.

3. A vehicle passive entry system comprising:

a key fob including a receiver for receiving a vehicle-originating signal, the receiver having a sensitivity based on comparing an expected received signal strength from an LF antenna in a factory controlled environment and a measured received signal strength from the LF antenna in the factory controlled environment;

a transmitter for transmitting a reply signal;

a received signal strength indicator (RSSI) for measuring a received signal strength of the vehicle-originating signal;

a memory storing sensitivity data corresponding to the sensitivity; and a control unit in electrical communication with the receiver, the transmitter, the RSSI and the memory, wherein the control unit is configured to communicate with the transmitter to direct the transmitter to transmit the reply signal, wherein the reply signal includes the measured received signal strength data and the sensitivity data; and a vehicle-side transmitter for transmitting the vehicle-originating signal;

a vehicle-side receiver for receiving the reply signal; and a vehicle-side control unit in electrical communication with the vehicle-side transmitter and the vehicle-side receiver, wherein the vehicle-side control unit is configured to compensate for the sensitivity unique to the key fob and to calculate distance between the fob and the vehicle-side transmitter based on the sensitivity data and the measured received signal strength in the reply signal.

* * * * *